United States Patent [19]

Ishihama et al.

[11] Patent Number: 5,557,328
[45] Date of Patent: Sep. 17, 1996

[54] VIDEO CAMERA HAVING AN IMPROVED ZOOM SYSTEM

[75] Inventors: Keiko Ishihama, Kanagawa; Tokuya Fukuda, Tokyo; Toshitaka Senuma, Tokyo; Toru Shiono, Tokyo, all of Japan

[73] Assignee: Sony Corporation, Tokyo, Japan

[21] Appl. No.: 344,520

[22] Filed: Nov. 23, 1994

Related U.S. Application Data

[63] Continuation of Ser. No. 25,778, Mar. 3, 1993, abandoned.

[30] Foreign Application Priority Data

Mar. 11, 1992 [JP] Japan ..................... 4-052028

[51] Int. Cl.$^6$ .................................. H04N 5/225
[52] U.S. Cl. ................ 348/358; 348/341; 348/240; 348/333
[58] Field of Search .................... 348/333, 341, 348/358, 240; 354/195.12; H04N 5/225

[56] References Cited

U.S. PATENT DOCUMENTS

| | | | |
|---|---|---|---|
| 4,478,493 | 10/1984 | Yokota | 350/336 |
| 4,527,201 | 7/1985 | Cappels | 358/224 |
| 4,843,475 | 6/1989 | Imai | 348/358 |
| 5,097,279 | 3/1992 | Sakamoto et al. | 354/106 |
| 5,161,025 | 11/1992 | Nakao | 358/224 |
| 5,196,877 | 3/1993 | Mukai et al. | 354/195.12 |
| 5,223,981 | 6/1993 | Kaneda | 358/227 |

FOREIGN PATENT DOCUMENTS

| | | | |
|---|---|---|---|
| 63-069383 | 8/1988 | Japan | H04N 5/262 |
| 1238283 | 9/1989 | Japan | H04N 5/225 |

Primary Examiner—Wendy Garber
Assistant Examiner—Andrew B. Christensen
Attorney, Agent, or Firm—Jay H. Maioli

[57] ABSTRACT

A video camera including a zoom-up lens assembly magnifying an image, a charge coupled device picking up the magnified image, a recording medium for storage of the magnified image and a viewfinder having a display panel and a liquid crystal device for determining a partial area of the display panel on which the magnified image to be recorded is displayed. The liquid crystal device is controlled by a microcomputer so as to form an opaque frame-like line surrounding the partial area of the display panel.

19 Claims, 1 Drawing Sheet

VIDEO CAMERA HAVING AN IMPROVED ZOOM SYSTEM

This is a continuation of application Ser. No. 08/025,778 filed Mar. 3 1993, now abandoned.

BACKGROUND OF THE INVENTION

The present invention relates to a video camera and more particularly to a video camera having an improved zoom system which is capable of definitely determining a zoomed portion of an image on a viewfinder.

Many video cameras have an optical magnifying unit and an electronic zooming unit which serve for zooming an image to be recorded. The optical zooming unit has a predetermined magnification capacity, for example usually up to three magnification. When the optical and electronic zooming units are combined, the video cameras are applicable for magnifying the image in higher magnification.

Some of such video cameras have an electronic viewfinder. The electronic viewfinder receives a video signal from the electronic zooming system and indicates the same image as that magnified by the electronic zooming unit on the basis of the transmitted video signal.

On the other hand, some video cameras have an optical viewfinder which indicates an image magnified at a predetermined magnification rate, for example three magnification. In the case of magnifying a portion of the image, the image including the zoomed portion and the peripheral remaining portion therearound is as a whole indicated on the viewfinder. Actually, the peripheral remaining portion of the image is not recorded on a recording medium such as a film. Thus, the zoomed portion of the image can not be identified on the viewfinder and distinguished from the peripheral remaining portion.

There is a demand to provide a video camera having an improved zooming system capable of definitely determining a zoomed portion of an image on a viewfinder.

SUMMARY OF THE INVENTION

An object of the present invention is to provide a video camera having an improved zooming system capable of definitely determining a zoomed portion of an image on a viewfinder.

According to the present invention, there is provided a video camera including optical means for focusing an image of a scene;

zoom-up means for magnifying the image focused by the optical means, the zoom-up means having a maximum magnification rate up to which the image is enlargeable;

pickup means for electronically picking up the image magnified by the zoom-up means;

a recording medium on which the image picked up is recorded;

a viewfinder disposed parallel to the optical means and including a display panel on which the image is displayed; and means for determining a partial area of the display panel on which the magnified image to be recorded is allowed to be displayed.

Further, according to the present Invention, there is provided a video camera including optical means for focusing an image of a scene;

zoom-up means for magnifying the image focused by the optical means, the zoom-up means having a maximum magnification rate up to which the image is enlargeable;

pickup means for electronically picking up the image magnified by the zoom-up means;

electronic zoom-up means for electronically magnifying the image picked up by the pickup means;

a recording medium on which the image picked up is recorded;

a viewfinder disposed parallel to the optical means and including a display panel on which the image is displayed; and means for determining a partial area of the display panel on which the magnified image to be recorded is allowed to be displayed.

DESCRIPTION OF THE PREFERRED EMBODIMENT

Figure 1:
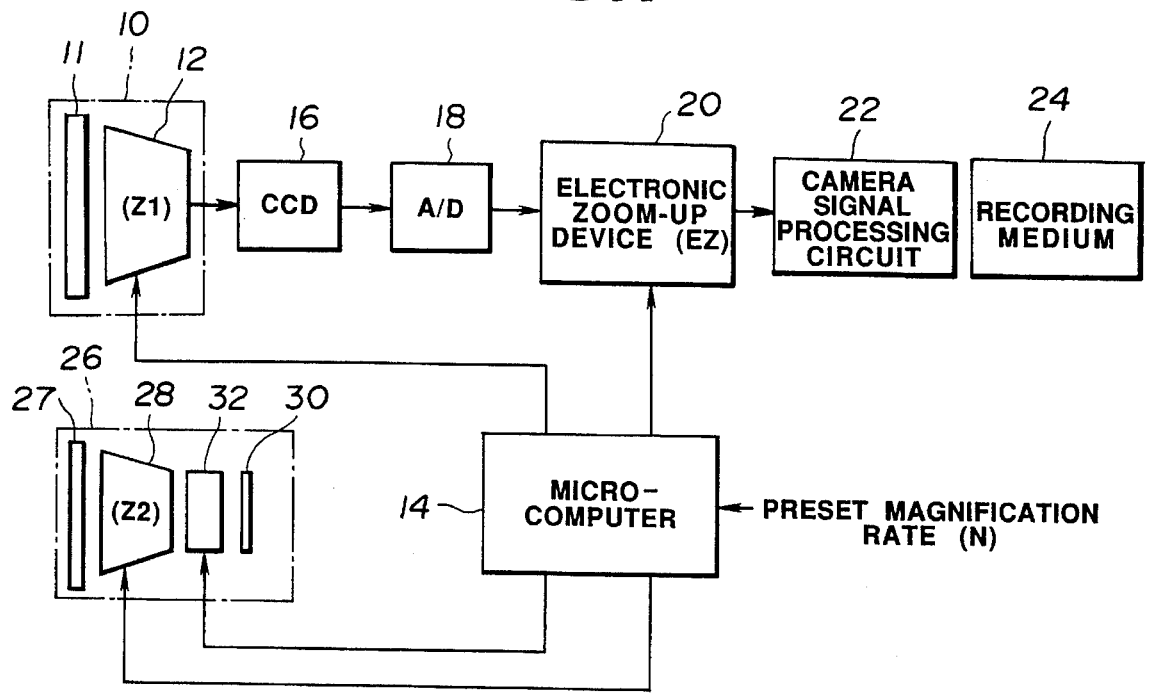
FIG. 1 is a schematic block diagram of a preferred embodiment of a video camera according to the present invention.

Referring now to FIG. 1, there is shown a video camera which has an optical lens unit 10 including a focusing lens assembly 11 for focusing an image of a scene and a zoom-up lens assembly 12 for magnifying the image. The zoom-up lens assembly 12 has a maximum magnification rate up to which the image received by the focusing lens assembly is enlargeable. The zoom-up lens assembly 12 is electrically connected to a microcomputer 14.

The microcomputer 14 is designed to provide a preset magnification rate "N" which is selected by a camera user. Based on the preset magnification rate "N", the microcomputer 14 transmits a zoom control signal to the zoom-up lens assembly 12 for varying the magnification rate thereof. The zoom-up lens assembly 12 variably magnifies the image focused by the focusing lens assembly at the magnification rate "N" depending upon the zoom control signal transmitted from the microcomputer 14.

The magnified image is transferred to a charge coupled device (CCD) 16 or any other conventional electronic image sensing device. The charge coupled device 16 picks up the magnified image and transmit an analog format of image data to an analog-to-digital converter 18. The analog-to-digital converter 18 converts the analog format of the image data to a digital format thereof which is transmitted to an image data memory cell (not shown) of an electronic zoom-up device 20.

The microcomputer 14, which is electrically connected to the electronic zoom-up device 20, transmits a zoom control signal for controlling the electronic zoom-up device 20. When the zoom control signal is received from the microcomputer 14, the electronic zoom-up device 20 is selectively operable or inoperable to magnify the digitalized image depending upon whether or not the preset magnification rate "N" exceeds the maximum magnification rate "Z1" of the zoom-up lens assembly 12 in a manner described in detail below. The "inoperable" state of the electronic zoom-up device 20 means that the device 20 exhibits equi-magnifying capacity, namely one magnification rate (x1). The electronic zoom-up device 20 interpolates the digital format of the image data In response to receipt of the zoom control signal. Thus, the image data is electronically magnified at the magnification rate of the electronic zoom-up device 20.

The image data from the electronic zoom-up device 20 is transmitted to a camera signal processing circuit 22. The camera signal processing circuit 22 performs a processing of the image data such as white-level control. The image data processed is directed to a recording medium 24 for storage.

As seen in FIG. 1, an optical viewfinder 26 is disposed in the video camera parallel to the optical lens unit 10. The optical viewfinder 26 includes a focusing lens assembly 27 for focusing an image of a scene and a zoom-up lens assembly 28 for magnifying the image passing through the focusing lens assembly. The zoom-up lens assembly 28 has a maximum magnification rate "Z2" up to which the image received by the focusing lens assembly is enlargeable. The maximum magnification rate "Z2" of the zoom-up lens assembly 28 is not more than the maximum magnification rate "Z1" of the zoom-up lens assembly 12 of the optical lens unit 10. The zoom-up lens assembly 28 is electrically connected to the microcomputer 14. The microcomputer 14 transmits a zoom control signal for varying the magnification rate of the zoom-up lens assembly 28. Thus, the image is magnified at the magnification rate of the zoom-up lens assembly 28 controlled by the microcomputer 14.

As shown in FIG. 1, the optical viewfinder 26 also includes a display panel 30 and a liquid crystal device 32 disposed between the display panel 30 and the zoom-up lens assembly 28. The liquid crystal device 32 is electrically connected to the microcomputer 14. The microcomputer 14 transmits a drive signal for driving the liquid crystal device 32 depending upon the zoom control signal transmitted to the zoom-up lens assembly 28.

Based on the preset magnification rate "N", the microcomputer 14 controls the zoom-up assembly 12, the electronic zoom-up device 20, the zoom-up assembly 28 and the liquid crystal device 32 in such a manner as described hereinafter.

When the preset magnification rate "N" at the microcomputer 14 is not more than the maximum magnification rate "Z1" of the zoom-up lens assembly 12, the microcomputer 14 controls the zoom-up lens assembly 12 so as to magnify the image at "N" magnification rate and controls the electronic zoom-up device 20 so as to be inoperable in its magnifying function. As a result, the image magnified at "N" magnification rate is transferred via the camera signal processing circuit 22 to the recording medium 24.

Figure 2:
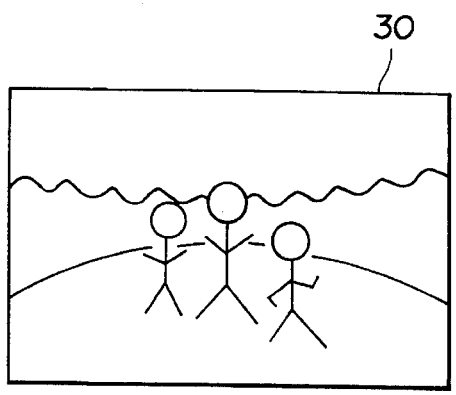
FIG. 2 shows an image which is indicated on a display panel of a viewfinder used in the video camera of the invention.

At the same time, the microcomputer 14 controls the zoom-up lens assembly 28 of the viewfinder 26 so as to magnify the image of the scene at "N" magnification rate and activates the liquid crystal device 32 so as to be transparent. The image passes through the transparent liquid crystal device 32 to be indicated on the display panel 30 as seen in FIG. 2.

On the other hand, when the preset magnification rate "N" at the microcomputer 14 is more than the maximum magnification rate "Z1" of the zoom-up lens assembly 12, the microcomputer 14 controls the zoom-up lens assembly 12 up to the maximum magnification rate "Z1". Then, the microcomputer 14 transmits the zoom control signal to operate the electronic zoom-up device 20 so as to magnify the image at a magnification rate "EZ" of the electronic zoom-up device 20. The magnification rate "EZ" of the electronic zoom-up device 20 is obtained by dividing the preset magnification rate "N" at the microcomputer 14 by the maximum magnification rate "Z1" of the zoom-up lens assembly 12. Namely, the magnification rate "EZ" is represented by a magnification rate "N/Z1". The image magnified is transferred via the camera signal processing circuit 22 to the recording medium 24.

Figure 3:
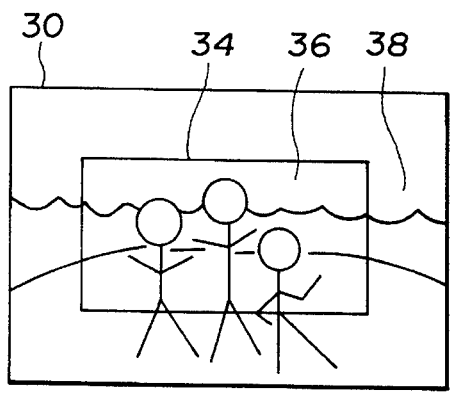
FIG. 3 shows an enlarged portion of the image of FIG. 2 which is surrounded by a frame.

At the same time, when the preset magnification rate "N" is more than the maximum magnification rate "Z1", the microcomputer 14 controls the zoom-up lens assembly 28 of the viewfinder 26 so as to magnify the image of the scene at the maximum magnification rate "Z2" and activates the liquid crystal device 32 so as to form an opaque frame-like line thereon. Furthermore, the liquid crystal device 32 operates to provide an inside transparent zone and an outside translucent zone formed inside and outside, respectively, of the opaque frame-like line. The opaque frame-like line and both zones of the liquid crystal device 32 are projected on the display panel 30. The opaque frame-like line projected on the display panel 30 acts as a rectangular frame 34 surrounding a portion 36 of the image projected through the inside transparent zone of the liquid crystal device 32 on the display panel 30, as seen in FIG. 3. The portion 36 of the image surrounded by the frame 34 corresponds to the magnified image to be recorded on the recording medium 24. Accordingly, the rectangular frame 34 on the display panel 30 serves for dividing a whole area of the display panel 30 into a clear image area 36 thereinside on which the magnified portion of the image to be recorded is displayed, and a dull image area 38 thereoutside on which the remaining portion of the image to be excluded from the recorded image is displayed. The image on the clear image area 36 is actually enlarged at a magnification rate equal to the magnification rate "EZ" of the electronic zoom-up device 20 when it is recorded on the recording medium 24.

One of either the zoom-up lens assembly 12 or the electronic zoom-up device 20 may be dispensable.

In such a case where the video camera dispenses with the electronic zoom-up device 20, the maximum magnification rate "Z1" of the zoom-up lens assembly 12 is more than the maximum magnification rate "Z2" of the zoom-up lens assembly 28.

Therefore, the respective magnification capacity of the zoom-up lens assemblies 12 and 28 and the electronic zoom-up device 20 may be desirably selected according to various requirements.

What is claimed is:

1. A video camera comprising:

optical means for focusing an image of a scene;

input means for inputting a selected magnification rate;

first zoom-up means for magnifying the image focused by said optical means in accordance with the selected magnification rate, said first zoom-up means having a first maximum magnification rate up to which the image is enlargeable, a magnification rate of said first zoom-up means being not more than the first maximum magnification rate of said first zoom-up means;

pickup means for electronically picking up the image magnified by said first zoom-up means;

processing means for processing the image electronically picked up by said pickup means;

a recording medium on which the processed image is recorded;

a viewfinder disposed optically parallel to said optical means for acquiring a second image of the scene and including second zoom-up means for magnifying the second image and having a second maximum magnification rate not more than the first maximum magnification rate of said first zoom-up means, a magnification rate of said second zoom-up means being not more than the second maximum magnification rate;

a display panel disposed in said viewfinder on which the magnified image from said second zoom-up means is displayed;

control means for comparing the selected magnification rate with the first maximum magnification rate of said first zoom-up means and with the second maximum magnification rate of said second zoom-up means; and indicator means for visually indicating a partial area of the image displayed by said display panel which corresponds to the magnified image to be recorded when the selected magnification rate exceeds the second maximum magnification rate of said second zoom-up means, wherein the entire image displayed on said display panel corresponds to the image to be recorded when the second maximum magnification rate of said second zoom-up means is not less than the selected magnification rate.

2. A video camera as claimed in claim 1, wherein said indicator means includes a liquid crystal device.

3. A video camera as claimed in claim 2, wherein said liquid crystal device of said indicator means provides a line forming a frame surrounding the partial area of the image displayed by said display panel which corresponds to the image to be recorded, the frame being variable in size according to the selected magnification rate when the selected magnification rate exceeds the second maximum magnification rate of said second zoom-up means.

4. A video camera as claimed in claim 3, wherein said control means controls the magnification rate of said first zoom-up means.

5. A video camera as claimed in claim 4, wherein said control means and said input means are incorporated into one microcomputer.

6. A video camera as claimed in claim 5, wherein said control means activates said indicator means for controlling a size of the frame.

7. A video camera as claimed in claim 6, wherein said viewfinder is an optical viewfinder.

8. A video camera as claimed in claim 6, wherein said control means controls the magnification rate of said second zoom-up means.

9. A video camera as claimed in claim 7, wherein the frame divides the image displayed by said display panel into two areas, including a clear image area inside the frame which corresponds to the image to be recorded and a visually dull image area outside the frame which corresponds to a remaining portion of the focused image which is not recorded.

10. A video camera comprising:

input means for inputting a selected magnification rate;

an optical lens unit including focusing means for focusing an image of a scene and first zoom-up means for magnifying the image focused by said focusing means in accordance with the selected magnification rate, said first zoom-up means having a first maximum magnification rate up to which the image is enlargeable;

pickup means for electronically picking up the image magnified by said first zoom-up means and for supplying a digitalized image thereof;

electronic zoom-up means for electronically magnifying the digitalized image supplied by said pickup means when the selected magnification rate exceeds the first maximum magnification rate of said first zoom-up means and for outputting an image to be recorded, the digitalized image being electronically magnified according to an electronic magnification rate of said electronic zoom-up means;

processing means for processing the image to be recorded;

a recording medium on which the processed image is recorded;

a viewfinder disposed optically parallel to said optical means for acquiring a second image of the scene and including second zoom-up means for magnifying the second image and having a second maximum magnification rate not more than a product of the first maximum magnification rate of said first zoom-up means and the electronic magnification rate of said electronic zoom-up means, and a display panel on which the image magnified by said second zoom-up means is displayed;

control means for comparing the selected magnification rate with the first maximum magnification rate of said first zoom-up means and with the second maximum magnification rate of said second zoom-up means, and for setting the electronic magnification rate of said electronic zoom-up means according to the selected magnification and the first maximum magnification rate; and indicator means for visually indicating a partial area of the image displayed by said display panel which corresponds to the image to be recorded when the selected magnification rate is greater than the second maximum magnification rate of said second zoom-up means, wherein the entire image displayed on said display panel corresponds to the image to be recorded when the second maximum magnification rate of said second zoom-up means is not less than the selected magnification rate.

11. A video camera as claimed in claim 10, wherein said electronic zoom-up means is activated by said control means when the selected magnification rate is greater than the first maximum magnification rate of said first zoom-up means.

12. A video camera as claimed in claim 11, wherein said indicator means includes a liquid crystal device.

13. A video camera as claimed in claim 12, wherein said indicator means provides a line forming a frame surrounding the partial area of the image displayed by said display panel which corresponds to the image to be recorded, the frame being variable in size according to the electronic magnification rate and a magnification rate of said first zoom-up means.

14. A video camera as claimed in claim 13, wherein said control means varies both the magnification rate of said first zoom-up means and the electronic magnification rate of said electronic zoom-up means.

15. A video camera as claimed in claim 14, wherein said control means and said input means are incorporated into one microcomputer.

16. A video camera as claimed in claim 15, wherein said indicator means is activated by said control means for controlling a size of the frame.

17. A video camera as claimed in claim 16, wherein said viewfinder is an optical viewfinder.

18. A video camera as claimed in claim 16, wherein said control means controls a magnification rate of said second zoom-up means.

19. A video camera as claimed in claim 17, wherein the frame divides the image displayed by said display panel into two areas, including a clear image area inside the frame which corresponds to the image to be recorded and a visually dull image area outside the frame which corresponds to a remaining portion of the focused image which is not recorded.

* * * * *